United States Patent [19]

Yamada et al.

[11] 3,959,380

[45] May 25, 1976

[54] PROCESS FOR PRODUCING 2-NITROCYCLOALKANONES

[75] Inventors: Shizuo Yamada; Hiroo Sasaki; Tetsuo Tanaka, all of Nanyo, Japan

[73] Assignee: Toyo Soda Manufacturing Co., Ltd., Yamaguchi, Japan

[22] Filed: Mar. 19, 1975

[21] Appl. No.: 559,795

Related U.S. Application Data

[63] Continuation-in-part of Ser. No. 231,536, March 3, 1972, abandoned.

[30] Foreign Application Priority Data

Mar. 3, 1971 Japan.............................. 46-10590

[52] U.S. Cl............................................. 260/586 R
[51] Int. Cl.²......................................... C07C 45/04

[58] Field of Search.................... 260/586 R, 586 P

[56] References Cited

UNITED STATES PATENTS 3,806,547    4/1974    Pivawer.......................... 260/586 R

*Primary Examiner*—Norman Morgenstern
*Attorney, Agent, or Firm*—Oblon, Fisher, Spivak, McClelland & Maier

[57] ABSTRACT

2-Nitrocycloalkanone, and its derivatives are prepared by reacting in a single step a cycloalkene with nitrogen dioxide and an oxygen containing gas in the presence of an aromatic hydrocarbon solvent having 6 – 10 carbon atoms, and a dimethylsulfoxide catalyst.

3 Claims, No Drawings

PROCESS FOR PRODUCING 2-NITROCYCLOALKANONES

CROSS-REFERENCE TO RELATED APPLICATIONS

This application is a continuation-in-part of U.S. application Ser. No. 231,536, filed Mar. 3, 1972 now abandoned.

BACKGROUND OF THE INVENTION

1. Field of the Invention

The present invention relates to a process for producing a 2-nitrocycloalkanone.

2. Description of Prior Art

2-Nitrocycloalkanone and its derivatives are useful substances in the production of polymers, and particularly in the production of nylon. Heretofore, these materials have been produced by such processes as the nitration of cycloalkenyl acetate with nitric acid; dehydrogenation of 2-nitrocycloalkanol with an oxidizing reagent; reaction of cycloalkenyl acetate with acetyl nitrate; etc. All of these prior art processes, however, required relatively expensive reactants, which were difficult to obtain. Moreover, they suffered from the distinct disadvantage that they resulted in relatively low product yields.

Alicyclic olefins have previously been converted to α-nitro-ketones in a two-step procedure using nitrogen dioxide (see Lachowicz, et al., "Peroxynitrates," *Journal of Organic Chemistry*, 32, pp. 3885 (1967)). Further, Lachowicz et al., in U.S. Pat. No. 3,657,349 show the application of a two-step nitrooxidation procedure for the conversion of cycloalkenes to nitrocycloalkanones, in which the cycloalkene is first oxidized by a combination of oxygen and dinitrogen tetroxide to an intermediate peroxy nitrate compound and then denitrated in a second step by a catalyst. However, these prior art procedures require the use of a two-step nitrooxidation procedure, and it would be very attractive industrially to provide a technique for producing 2-nitrocycloalkanones in a single-step procedure.

The disclosure of Pivawer in U.S. Pat. No. 3,806,547 shows such a one-step nitrooxidation procedure of cycloalkenes in which a cycloalkene is nitrooxidized by oxygen and dinitrogen tetroxide in the presence of a denitrating catalyst and a dipolar, aprotic solvent. In the process, large quantities of water must be added to the reaction solution to separate the product. This means that in order to recover the catalyst in an anhydrous state, extra equipment must be used to remove water. The amount of water required to treat the reaction solution is dependent upon the amount of catalyst present. Further, it is important from the industrial economic viewpoint that the amount of catalyst used be reduced to as small amounts as possible.

Therefore, a need continues to exist for a one-step procedure for the nitrooxidation of cycloalkenes in which the product nitrocycloalkanone is obtained in high yields, the amount of catalyst is minimized and the use of water to extract the catalyst from solution is avoided.

SUMMARY OF THE INVENTION

Accordingly, it is one object of this invention to provide an industrially acceptable method for producing 2-nitro-cycloalkanones, in relatively high yields.

It is another object of this invention to provide a process of producing 2-nitrocycloalkanones whereby undesirable side reactions are suppressed to a significant extent.

Another object of this invention is to provide a process for producing 2-nitrocycloalkanones from relatively inexpensive and readily available reactants such that the product is obtained economically.

A still further object of this invention is to provide a single-step procedure for producing 2-nitrocycloalkanones.

These and other objects, as will hereinafter become more readily apparent, have been attained by the one-step reaction of cycloalkene with nitrogen dioxide and an oxygen containing gas in the presence of dimethylsulfoxide and an aromatic hydrocarbon solvent having 6 – 10 carbon atoms.

DETAILED DESCRIPTION OF PREFERRED EMBODIMENTS

The reaction of the present invention can be schematically characterized by the formula:

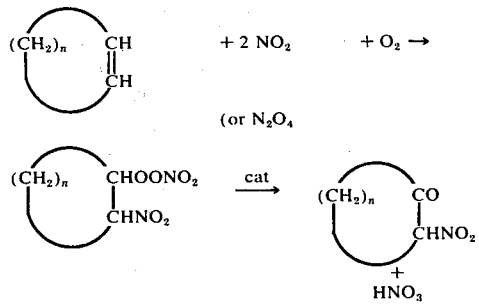

This reaction is quite industrially advantageous since all of the reactant materials are readily available and are relatively inexpensive. The denitrating catalyst used in this reaction is dimethylsulfoxide (DMSO).

The DMSO catalyst can be added to the reaction medium in a single step procedure by adding the catalyst to the reactants prior to the initiation of the reaction.

The cycloalkene used in this reaction may have a carbon number of from 5–12, and may include any of the more common cycloalkenes, such as cyclopentene, cyclohexene, cyclooctene, cyclodecene, cyclododecene, or the like.

The nitrogen dioxide may be used in the form of nitrogen dioxide, dinitrogen tetraoxide, or more commonly, an equilibrium mixture of nitrogen dioxide and dinitrogen tetraoxide.

Oxygen may be used in a relatively pure form or may be used in a mixture with an inert gas, such as in the form of air. The mole ratio of oxygen to nitrogen dioxide should be within the range 1 : 1 – 40.

The nitrooxidation reaction is preferably conducted below 20°C, but because the reaction is carried out in the presence of the catalyst, the reaction temperature may be as high as 50°C without any serious decrease in the yield of 2-nitrocycloalkane. This is considered to be one of the more surprising aspects of the use of the DMSO catalyst of this invention.

Of course, the reaction should not be conducted at a temperature less than the ability of the solvent used to maintain a solution. Normally, therefore, the reaction should be conducted within the temperature range of −40° to +50°C and preferably −20° to +30°C, when the reaction is conducted in the presence of the catalyst.

It has been assumed, according to chemical theory, that the overall reaction must occur in a two-step procedure, since it was thought that the presence of the denitrating catalyst would deleteriously affect the first step of the conventional two-step procedure by causing such side reactions as the reaction of cycloalkene with nitric acid and/or nitrogen dioxide, or the reaction of the product 2-nitrocycloalkanones with nitrogen dioxide to form unstable intermediates which would then be converted to other products by various complicated mechanisms. Completely unexpectedly, it has now been found that the presence of the DMSO denitrating catalyst, in fact, gives unexpectedly high yields of product.

This discovery has led to the present one-step procedure. To obtain the benefits of the synergistic effects, the catalyst should be used in the one-step reaction in at least an equimolar amount based on the amount of cycloalkene, preferably in amounts of 1.0 – 10 moles per mole of cycloalkene. The particular amount of catalyst to be used in any particular instance will depend upon the particular cycloalkene used, and upon the conversion rate of the cycloalkene.

Since the reaction of this invention is normally carried out at low temperatures, as discussed above, it is desirable to use a solvent which will maintain the solution, and which has good solvating effects toward cycloalkene, the reaction products and the catalyst. The solvent should also be readily separable from the reaction products, i.e., it should have a relatively low boiling point, and should be generally inert to the system. Of course, all of these conditions do not necessarily have to be met to achieve a suitable reaction. Suitable solvents in the present one-step reaction include the aromatic hydrocarbons having 6 to 10 carbon atoms, such as benzene, toluene, xylene, ethylbenzene, diethylbenzene, isopropylbenzene, amylbenzene, and the like. When the amount of the solvent used is too small, cycloalkene, the reaction products, and the catalyst cannot be sufficiently dissolved, whereas if it is too large, it tends to cause an increase in recovery costs and a loss of solvent. The particular quantity of solvent to use will depend upon the particular solvent used, the reaction temperature and the type of cycloalkene, etc. Normally, the solvent is used in an amount of from 4 – 40 times the weight amount of cycloalkene. When the catalyst is mixed with other solvents, the volume ratio of the catalyst and other solvents should be within the range of 1 : 3–200, more preferably 1 : 6 – 100, to obtain the full synergistic effects.

Having generally described this invention, a further understanding can be obtained by reference to certain specific examples which are provided herein for purpose of illustration only and are not intended to be limiting unless otherwise specified.

In the following Examples the DMSO and dimethylformamide (DMF) catalysts compared were purified in the same manner by subjecting each to $CaH_2$ and thereafter each liquid was dried. As a consequence, the amount of water in each catalyst was greatly reduced an indicated in the following table.

| Catalyst | With drying treatment | No drying treatment |
|---|---|---|
| DMF | 0.001 wt % | 0.02 wt % |
| DMSO | 0.012 wt % | 0.24 wt % |

The presence of water in the catalyst greatly reduces the amount of product obtained because the nitrocycloalkanone product is easily hydrolyzed by water.

EXAMPLE 1

A 300 cc amount of purified toluene, 42.0 g of dimethylsulfoxide and 60.0 g of cyclododecene were placed into a 500 cc flask, and the contents were reacted by being stirred at 5°C while a mixed gas of oxygen and nitrogen dioxide ($O_2/N_2O_4=10/1$) was passed into the flask. The stream of inflowing mixed gas was continued for four hours until the amount of nitrogen dioxide injected amounted to 34.0 g and the stirring was continued for an additional 15 minutes at 5°C. Although some complexes of dimethylsulfoxide and nitric acid were formed during the reaction, their presence was not detrimental to the smooth progress of the reaction. After the reaction was completed, the complex was filtered in the nitrogen stream and dried, and 2.3 g of the crystal was obtained. Subsequently, the reaction liquid was transferred to a separatory funnel, washed with 120 ml of water to remove the residue of dimethylsulfoxide and nitric acid, dried with anhydrous sodium sulfate, and then analyzed by gas chromatography and high velocity liquid chromatography. Gas chromatography using an internal standard showed that the yield of 2-nitrocyclododecene was 90.3%.

EXAMPLE 2

A 300 cc amount of purified carbon tetrachloride, 42.0 g of purified dimethylsulfoxide, and 60.0 g of cyclododecene were placed into a 500 cc flask and stirred at 5°C while a mixed gas of oxygen and nitrogen dioxide was passed into the flask as described in Example 1. About 30 minutes after the initiation of the reaction, complexation of dimethylsulfoxide and nitric acid began to occur. Thereafter, because the gas inlet of the flask was often clogged with crystals, the reaction had to be interrupted to remove the crystals. The reaction was continued in the state of slurry for four full hours (not counting the time of interruption) until the same amount of the mixed gas as Example 1 was passed into the flask. Thereafter, stirring was continued for an additional 15 minutes at 5°C, and the reaction was completed.

After the reaction was over, the crystals of the complex were filtered, washed with carbon tetrachloride, dried, and measured to yield 40.9 g.

The reaction solution was treated and analyzed in a manner similar to Example 1. The yield of 2-nitrocyclododecanone was 84.6%.

EXAMPLE 3

A 300 g amount of purified ether, 42.0 g of purified dimethylsulfoxide and 60.0 g of cyclododecene was placed into a 500 cc flask and stirred at 5°C while a mixed gas of oxygen and nitrogen dioxide was passed into the flask as described in Example 1. About 40 minutes after initiation of the reaction, crystals of the complex of dimethylsulfoxide and nitric acid began to form. Further, because the gas inlet of the flask was often clogged with these crystals, the reaction had to be interrupted to remove them. The reaction was continued in the state of slurry for four full hours, not counting the times of interruption, until the quantity of the mixed gas in the same amount with Example 1 was injected into the flask. Thereafter, the stirring was continued for an additional 15 minutes at 5°C before the reaction was over.

After the reaction was over, crystals of the complex were filtered in the nitrogen stream, washed with ether, dried, and measured to yield 35.4 g.

The reaction solution was treated and analyzed in a manner similar to Example 1. The yield of 2-nitrocyclododecanone was 74.0%.

EXAMPLE 4

A 300 cc amount of purified dimethylformamide and 60.0 g of cyclododecene were placed in a 500 cc flask. This solution did not become uniform and completely divided into two layers. The solution was stirred well at 5°C while the mixed gas of oxygen and nitrogen dioxide was passed into the flask as described in Example 1. When an amount of the mixed gas, the same as injected in Example 1, was passed into the flask over a span of four hours, the supply of the gas was stopped but the stirring was continued for an additional 15 minutes. Thereafter, the reaction was ended. The reaction solution was poured into 1500 ml of water and the product was extracted with benzene. The benzene solution was dried with anhydrous sodium sulfate, and then analyzed similarly as in Example 1. The yield of 2-nitrocyclododecanone was 78.0%. According to analysis by high velocity liquid chromatography, it was especially noticed that more by-products are produced as polymers than as main-products.

EXAMPLE 5

A 300 cc amount of purified toluene, 39.3 g of purified dimethylformamide, and 60.0 g of cyclododecene were placed into a 500 cc flask and stirred at 5°C while the mixed gas of oxygen and nitrogen dioxide was passed into the flask as described in Example 1. The supply of the mixed gas was discontinued when the same amount of gas as described in Example 1 was injected in four full hours. The stirring was continued for an additional 15 minutes before the reaction was over. During the reaction, no solid was formed and the solution was invariably in a uniform state.

The reaction solution was transferred to a separatory funnel, and washed with water. After the removal of dimethylformamide and nitric acid, it was dehydrated with anhydrous sodium sulfate. Thereafter, the product was analyzed and the yield of 2-nitrocyclododecanone was 83.6%.

EXAMPLE 6

A 300 cc amount of purified dimethylsulfoxide and 60.0 g of cyclododecene were placed into a 500 cc flask and stirred at 20°C while a mixed gas of oxygen and nitrogen dioxide was passed into the flask as described in Example 1. It had been expected that the reaction solution would be colored brown by the nitrogen dioxide fed and that the reaction velocity would be substantially slower as compared to Examples 1 to 5.

When 17.0 g of nitrogen dioxide was passed into the flask over two hours, the supply of the mixed gas was discontinued. The stirring was continued for an additional 30 minutes, but the color of the reaction solution because of the presence of nitrogen dioxide did not become thin.

The reaction solution was poured into a large quantity of water, and the unreacted material and the product were extracted with benzene. After the benzene layer was washed well with water, it was dried and analyzed. As a result, 98% of the cyclododecene starting material was recovered and only a trace of the formation of 2-nitrocyclododecanone was found.

The data from Examples 1 to 6 is summarized in the following table.

| Ex. | Cat. | Solvent | Olefin Conc. (w/v) % | Mole ratio | DMSO /Solv. | R.Temp. | Complex | Yield % | Ref. |  |
|---|---|---|---|---|---|---|---|---|---|---|
| 1 | DMSO 42.0g | Toluene 300cc | 14.8 | 1.5 | 1:7.14 | 5°C | 2.3 g 6% | 90.3 | DMSO-Toluene |  |
| 2 | DMSO 42.0g | CCl₄ 300cc | 14.8 | 1.5 | 1:7.14 | 5 | 40.9g 95% | 84.6 | DMSO-CCl₄ | poorer operation and lower yield than Example 1 |
| 3 | DMSO 42.0g | Ether 300cc | 14.8 | 1.5 | 1:7.14 | 5 | 35.4g 94% | 74.0 | DMSO-Ether | poorer operation and lower yield than Example 1 |
| 4 | DMF 300cc | — | 16.3 | 10.8 | ∞ | 5 | — | 78.0 | DMF alone | lower yield than Example 1 |
| 5 | DMF 39.3g | Toluene 300cc | 14.6 | 1.5 | 1:7.7 | 5 | — | 83.6 | DMF-Toluene | lower yield than Example 1 |
| 6 | DMSO 300cc | — | 16.3 | 11.7 | ∞ | 20 | — | 0 | DMSO alone (DMSO (mp) 18°C) | no reaction |

The data shows the following:

1. DMSO is different from dimethylformamide (DMF) as a denitrating catalyst in that it cannot be used alone. A solvent is required;
2. Best results are obtained when an aromatic hydrocarbon solvent is used with DMSO compared to other aprotic solvents such as carbon tetrachloride and ether;
3. DMF also gives higher yields when used in a solvent than when used alone;
4. Aromatic hydrocarbons are superior to other solvents because:
   a. the yields of product are higher, and
   b. the aromatic hydrocarbons more readily dissolve the complex of DMSO and nitric acid, i.e., it prevents the formation of the crystalline complex. Thus, a comparison of Examples 1–3 shows the following with regard to the formation of the complex:

| Example | Solvent | Separation of complex from solution |
|---|---|---|
| 1 | toluene | 6 % |
| 2 | CCl₄ | 95 % |

| Example | Solvent | Separation of complex from solution |
|---|---|---|
| 3 | Ether | 94 % |

(The above data was obtained on the basis that 1 mole of nitric acid was produced per one mole of 2-nitrocyclododecanone produced.)

The data clearly show that the amount of complex which separated from solution in ether and $CCl_4$ solvents was roughly 16 times the amount which separated from the toluene solvent. Note further, that extensive clogging of the gas inlet was observed in Examples 2 and 3.

5. When DMF was used alone as shown in Example 4, the cyclododecene and catalyst separated into two layers and polymerization occurred in a state of suspension. Liquid chromatography of the product showed a low yield of product and high yields of by-products of molecular weights greater than 2-nitrocyclododecanone. It is believed that these results were attained because the solution was not uniform, which in effect promotes a partial increase in the concentration of cyclododecene resulting in an increase of the larger molecular weight by-products.

6. When DMF was used in combination with toluene (Example 5), the yield of product was greater than when DMF was used alone (Example 4), but less than the yield of product from DMSO-toluene (Example 1).

From the above, it is clear that unexpected advantages are achieved when the combination of DMSO-aromatic hydrocarbon is used because:

a. High yields of product are obtained;

b. The solubility of the catalyst-nitric acid complex is greater in the aromatic hydrocarbon solvent, which indicates that these solvents are superior to other conventional solvents; and c. DMSO, a high-priced polar substance, is effective in only small amounts (about one-eighth the amount of DMF).

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for producing 2-nitrocycloalkanones, which comprises:
   reacting in a one-step reaction, a cycloalkene having a carbon number of 5 – 12, with an oxygen containing gas and nitrogen dioxide in the presence of an aromatic hydrocarbon solvent having 6 – 10 carbon atoms and a dimethylsulfoxide catalyst, wherein the volume ratio of said catalyst to said solvent is 1 : 3 – 200 and the mole ratio of said catalyst to said cycloalkene is 1.0 – 10.0 : 1.

2. The process of claim 1, wherein said aromatic hydrocarbon solvent is toluene, benzene, xylene, ethylbenzene, diethylbenzene, isopropylbenzene or amylbenzene.

3. The process of claim 1, wherein the temperature of said reaction is −40° to 50°C.

* * * * *